(12) United States Patent
Wang (10) Patent No.: US 9,405,378 B2
(45) Date of Patent: Aug. 2, 2016

(54) GESTURE CONTROL SYSTEM CAPABLE OF INTERACTING WITH 3D IMAGES

(71) Applicant: LIQUID3D SOLUTIONS LIMITED, Tsim Sha Tsui, Kowloon (HK)

(72) Inventor: Johnny Paul Zheng-Hao Wang, Pingzhen (TW)

(73) Assignee: LIQUID3D SOLUTIONS LIMITED, Tsim Sha Tsui, Kowloon (HK)

( * ) Notice: Subject to any disclaimer, the term of this patent is extended or adjusted under 35 U.S.C. 154(b) by 0 days.

(21) Appl. No.: 14/509,045

(22) Filed: Oct. 7, 2014

(65) Prior Publication Data

US 2016/0062471 A1 Mar. 3, 2016

(30) Foreign Application Priority Data

Sep. 3, 2014 (TW) .............................. 103130340 A (51) Int. Cl.
*G06F 3/01* (2006.01)
*G06F 3/0346* (2013.01)

(52) U.S. Cl.
CPC .............. *G06F 3/017* (2013.01); *G06F 3/0346* (2013.01)

(58) Field of Classification Search
CPC .......... G06F 3/01; G06F 3/017; G06F 3/0346
USPC .................................................. 345/156–173
See application file for complete search history.

(56) References Cited

U.S. PATENT DOCUMENTS

| | | | | |
|---|---|---|---|---|
| 6,147,678 A | * | 11/2000 | Kumar ..................... | G06F 3/017 345/156 |
| 2010/0253622 A1 | * | 10/2010 | Makita ..................... | A63F 13/04 345/158 |
| 2012/0120056 A1 | * | 5/2012 | Kim .................... | H04N 13/0048 345/419 |
| 2013/0050069 A1 | * | 2/2013 | Ota ........................ | G06F 3/011 345/156 |
| 2013/0100121 A1 | * | 4/2013 | Cha ....................... | H04N 19/597 345/419 |

* cited by examiner

*Primary Examiner* — Grant Sitta
(74) *Attorney, Agent, or Firm* — Cheng-Ju Chiang (57) ABSTRACT

A gesture control system capable of interacting with three-dimensional (3D) images comprises a 3D image display device, a gesture recognition device, and a data processing unit. The 3D image display device displays a 3D image. The gesture recognition device captures a hand(s) and finger(s) image of a user and then calculates a hand(s) and finger(s) coordinate. The hand(s) and finger(s) coordinate is transmitted to the data processing unit and is matched with an image 3-dimensional spatial coordinate for being output via the 3D image display device in order to achieve advantages of interacting with 3D images.

9 Claims, 8 Drawing Sheets

GESTURE CONTROL SYSTEM CAPABLE OF INTERACTING WITH 3D IMAGES

BACKGROUND OF THE INVENTION

1. Field of the Invention

The present invention relates to a gesture control system, particularly with regard to a gesture control system capable of interacting with three-dimensional (3D) images.

2. The Related Arts

Figure 1:
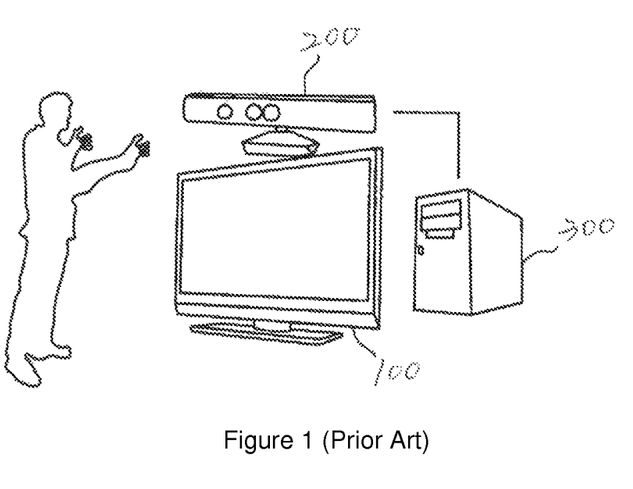
FIG. 1 shows a schematic diagram of a conventional gesture recognition system in a using status thereof.

A conventional gesture recognition system is shown in FIG. 1. A motion sensor 200 thereof is linked to an operating system (e.g., Windows®) installed in a host computer 300 through drivers. The host computer 300 is coupled with a monitor 100. Users can make gestures in front of the motion sensor 200 to simulate commands of the system, such as mouse operations, after recognition of the motion sensor 200, and thus operates the operating system through the monitor 100.

The gesture recognition system mentioned above uses a set of hand(s) and finger(s) gestures, such as forward-pushing, back-retracting, finger(s) circling, to simulate command operations including button pressing and/or releasing operations. Therefore, some companies recently in the industry developed a somatosensory control system, which can capture characteristic postures and hand(s) and fingers(s) gestures to achieve the purpose of physically interacting with computers by determinations of a variety of postures and movements of human body parts. For example, a somatosensory player Xbox® is designed to realize game progression via sensing movements of human bodies. Hence, the human body moves according to changes of characters or scenes in the game.

However, the somatosensory control system mentioned above has a limitation in terms of interactivity between display images and human body gestures. Such a system described above does not have a direct link between the graphics or images on the display to the human body gestures, rather only have an indirect link of the system wherein the human body gestures are translated to a command, and then the graphics or images on the display are changed due to the execution of the command. Absence of a direct link between graphics or images and the gestures makes the system's interactivity less realistic and is not a true representation or simulation of real world physics or motions.

In view of the above, inventor(s) of the present invention felt that the above mentioned problem could be changed, improved, and enhanced by creating a methodology to provide a direct link between the display graphics or images with human body gestures by inventing a system composed of a 3D stereoscopic or auto-stereoscopic display, somatosensory controller, and software. Such a system can match human hand(s) and finger(s) gestures with the 3D graphics or images in a way that resembles real world interactions between a person's hand(s) or finger(s) and visual objects. The above is inventor's motivation for research and innovation of the present invention.

SUMMARY OF THE INVENTION

The main objective of the present invention is to provide a gesture control system capable of interacting with 3D images in order to improve the problem and drawback of prior techniques.

The technology and means adopted and used in the present invention for solving the problem of prior techniques are as follows. A gesture control system capable of interacting with 3D images comprises a 3D image display device for displaying stereoscopic or auto-stereoscopic images, a gesture recognition device, and a data processing unit. The 3D image display device displays a 3D stereoscopic or auto-stereoscopic image. The gesture recognition device comprises a hand(s) and finger(s) image detection module and a hand(s) and finger(s) coordinate tracking module, and the hand(s) and finger(s) image detection module is electrically connected to the hand(s) and finger(s) coordinate tracking module. The hand(s) and finger(s) image detection module captures a hand(s) and finger(s) image of a user, and the hand(s) and finger(s) coordinate tracking module calculates a hand(s) and finger(s) coordinate based on the sensory data from the hand(s) and finger(s) image detection module. The data processing unit is electrically connected to the 3D image display device and the gesture recognition device, and comprises a central processing unit and a graphic processing unit. The central processing unit is electrically connected to the graphic processing unit. The central processing unit comprises a built-in software algorithm program, and one of the central processing unit and the graphic processing unit comprises a built-in image coordinate software program, which establishes an image 3-dimensional spatial coordinate based on an image pixel data. A sensing functional area is defined by the position and orientation of the gesture recognition device. When user's hand(s) and finger(s) move within the sensing functional area, the gesture recognition device captures a hand(s) and finger(s) image and calculates hand(s) and finger(s) coordinates. The hand(s) and finger(s) coordinates are transmitted to the data processing unit for calculation and software processing to match with the image's 3-dimensional spatial coordinates that are outputted to the 3D image display device.

In an embodiment of the present invention, the 3D image display device is selected from one of a liquid crystal display, a plasma display panel, and an organic light-emitting diode display capable of displaying 3D stereoscopic or 3D auto-stereoscopic images.

In an embodiment of the present invention, the gesture recognition device is selected from one of a 3D stereo camera, a single camera, an infrared sensor, and a time-of-flight sensor.

In an embodiment of the present invention, the hand(s) and finger(s) image comprises a node graph and a depth graph of the user's hand(s) and finger(s).

In an embodiment of the present invention, the data processing unit is equipped with a data storage module, and the data storage module is electrically connected to the central processing unit and the graphic processing unit.

In an embodiment of the present invention, the data storage module comprises a plurality of built-in image data which are image files or graphic files, and the files are subjected to be read by the data processing unit and be output via the 3D image display device.

By the technology and means adopted in the present invention, the hand(s) and finger(s) image detection module captures a hand(s) and finger(s) image of a user, and the hand(s) and finger(s) coordinate tracking module calculates a hand(s) and finger(s) coordinate based on the sensory data from the hand(s) and finger(s) image detection module. The hand(s) and finger(s) coordinates are then transmitted to the data processing unit for calculation and software processing to match with the image's 3-dimensional spatial coordinates that are outputted to the 3D image display device in order to achieve advantages of real-world interaction and simulation with 3D images.

The physical embodiments adopted in the present invention will be presented by the following depicted embodiments and accompanying drawings for further explanations.

DETAILED DESCRIPTION OF PREFERRED EMBODIMENT

Figure 2:
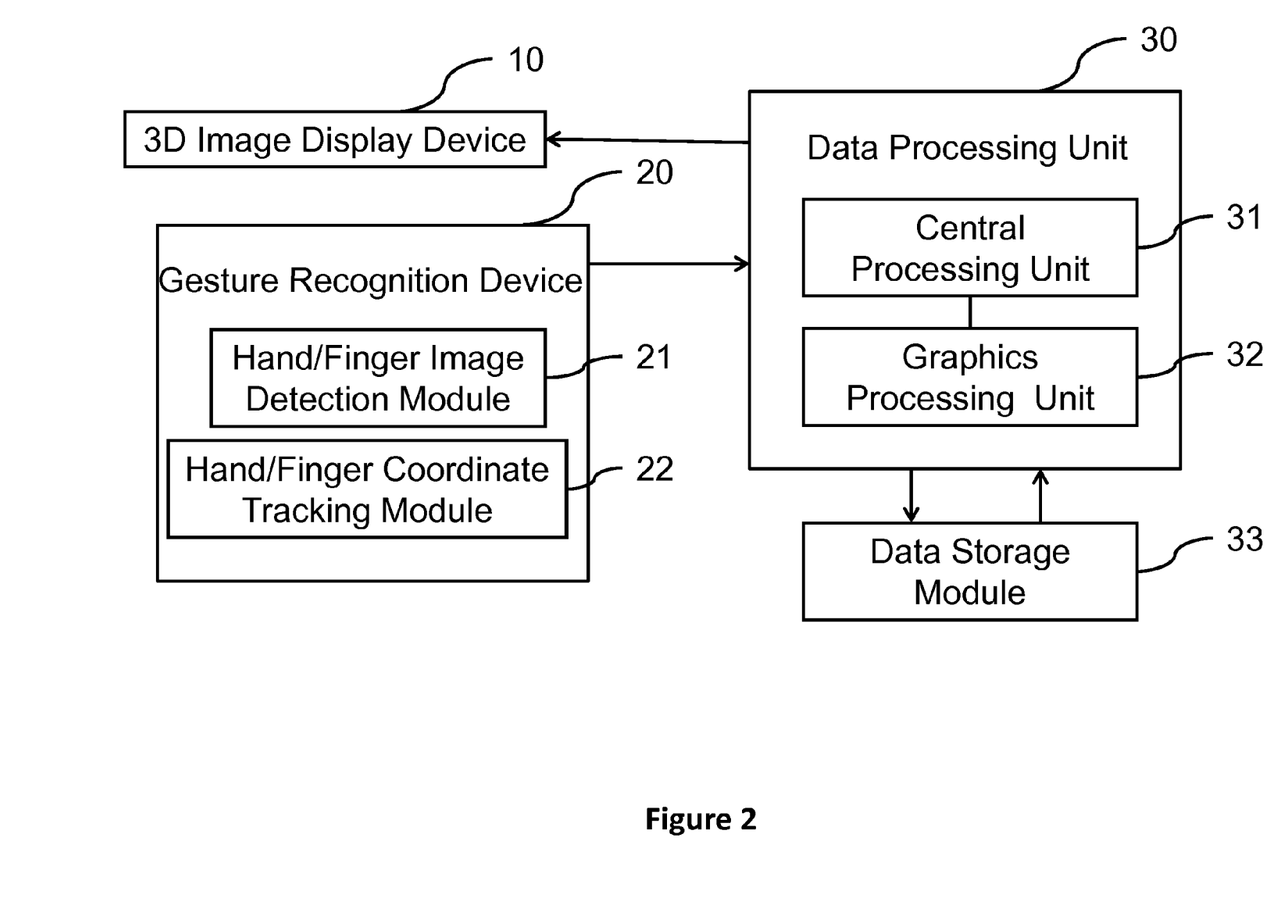
FIG. 2 shows a structural schematic diagram of a gesture control system capable of interacting with 3D images in accordance with the present invention.

With reference to FIG. 2, an embodiment of a gesture control system capable of interacting with three-dimensional (3D) images in accordance with the present invention comprises a 3D image display device 10 for displaying stereoscopic or auto-stereoscopic images, a gesture recognition device 20, and a data processing unit 30.

The 3D image display device 10 reads an image data from the data processing unit 30, and displays a 3D image for users to watch. The 3D image display device 10 can be selected from one of a liquid crystal display (LCD), plasma display panel (PDP), and organic light-emitting diode display (OLED display) capable of displaying stereoscopic or auto-stereoscopic images. In the embodiment, the 3D image display device 10 is selected to be a liquid crystal display capable of displaying stereoscopic or auto-stereoscopic images.

The gesture recognition device 20 comprises a hand(s) and finger(s) image detection module 21 and a hand(s) and finger(s) coordinate tracking module 22. The hand(s) and finger(s) image detection module 21 is electrically connected to the hand(s) and finger(s) coordinate tracking module 22. Among them, a sensing functional area is defined by positions and coordinates of the gesture recognition device 20, and a size of the sensing functional area varies based on sensing element types, quantity or deploying configuration, and so on, of the gesture recognition device 20. The gesture recognition device 20 is selected from one of a 3D stereo camera, a single camera, an infrared sensor, and a time-of-flight sensor. When users' hand(s) and finger(s) move within the sensing functional area, the hand(s) and finger(s) image detection module 21 captures a hand(s) and finger(s) image of the users. The hand(s) and finger(s) image comprises a node graph and a depth graph of hand(s) and finger(s) movements of the users. The hand(s) and finger(s) coordinate tracking module 22 calculates a hand(s) and finger(s) coordinate B based on sensor data of the hand(s) and finger(s) image detection module 21, and transmits the hand(s) and finger(s) coordinate B to the data processing unit 30 through a data transmission cable or wireless data module.

The data processing unit 30 is electrically connected to the 3D image display device 10 and the gesture recognition device 20. The data processing unit 30 comprises a central processing unit (CPU) 31 and a graphic processing unit (GPU) 32, and the central processing unit 31 is electrically connected to the graphic processing unit 32. The central processing unit 31 comprises a built-in software algorithm program, and one of the central processing unit 31 and the graphic processing unit 32 comprises a built-in image coordinate software program. The software program establishes an image 3-dimensional spatial coordinate A based on an image data and the image coordinate A will vary because of different sizes of the 3D image display device 10. The algorithm program built-in the central processing unit 31 is used to compare the hand(s) and finger(s) coordinates B with the image 3-dimensional spatial coordinate A, and processes operations of image and hand(s) and finger(s) coordinates superimposition. In this embodiment, the data processing unit 30 is equipped with a data storage module 33, and the data storage module 33 is electrically connected to the central processing unit 31 and the graphic processing unit 32 of the data processing unit 30. The data storage module 33 comprises a plurality of built-in image files or graphic files, which can be read by the graphic processing unit 32 and then be output by the 3D image display device 10. The image files or graphic files mentioned above can be a dynamic image files or static graphic files. Of course, the dynamic image files or the static graphic files can be saved via a digital disc (DVD), a universal serial bus storage (USB storage), a hard disk (HD), or another type of data storage devices and then be loaded into the data processing unit 30.

In use, the 3D image display device 10 reads an image data from the data processing unit 30, and displays a 3D image for the users to watch. At this time, the graphic processing unit 32 of the data processing unit 30 establishes an image 3-dimensional spatial coordinate A based on the image data. Assuming that the origin of a real world coordinate is (0, 0, 0), please refer to FIGS. 3-5 and Table 1 as follows (FIG. 3 exemplified in the first column of Table 1, and so on).

TABLE 1

Figure 3:
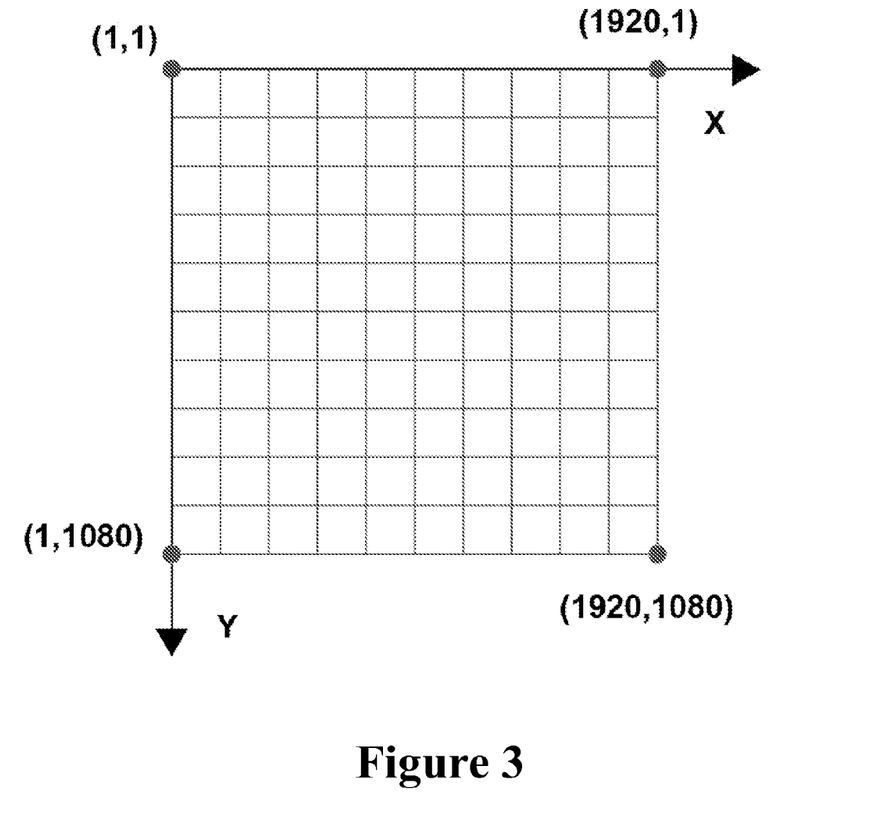
FIG. 3 shows an image pixel coordinate schematic diagram of a gesture control system capable of interacting with 3D images in accordance with the present invention.
Figure 4:
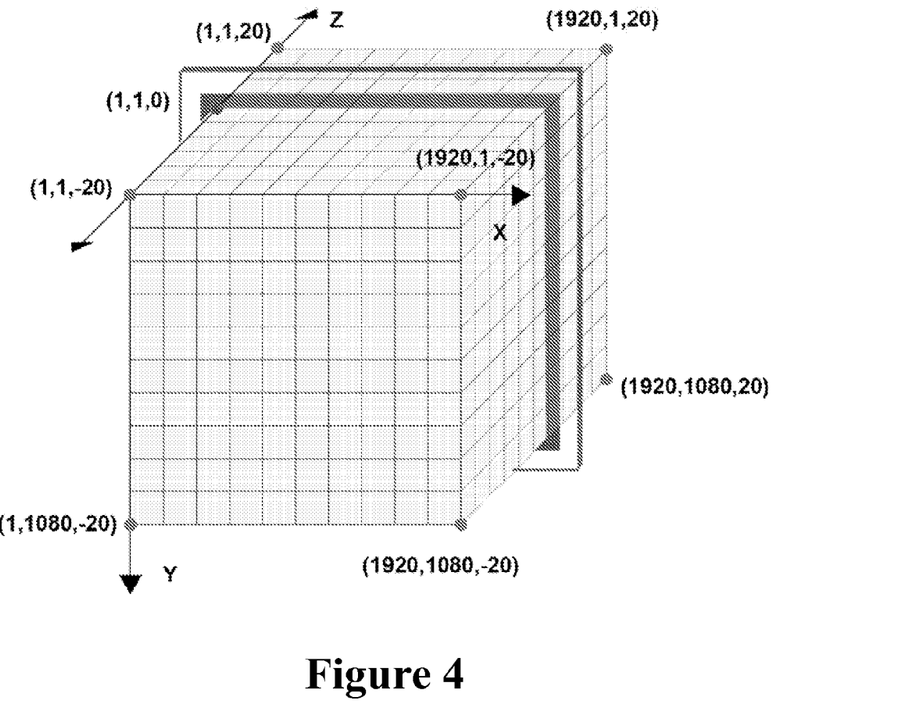
FIG. 4 shows an image pixel coordinate schematic diagram of a 3D image display device of a gesture control system capable of interacting with 3D images in accordance with the present invention.
Figure 5:
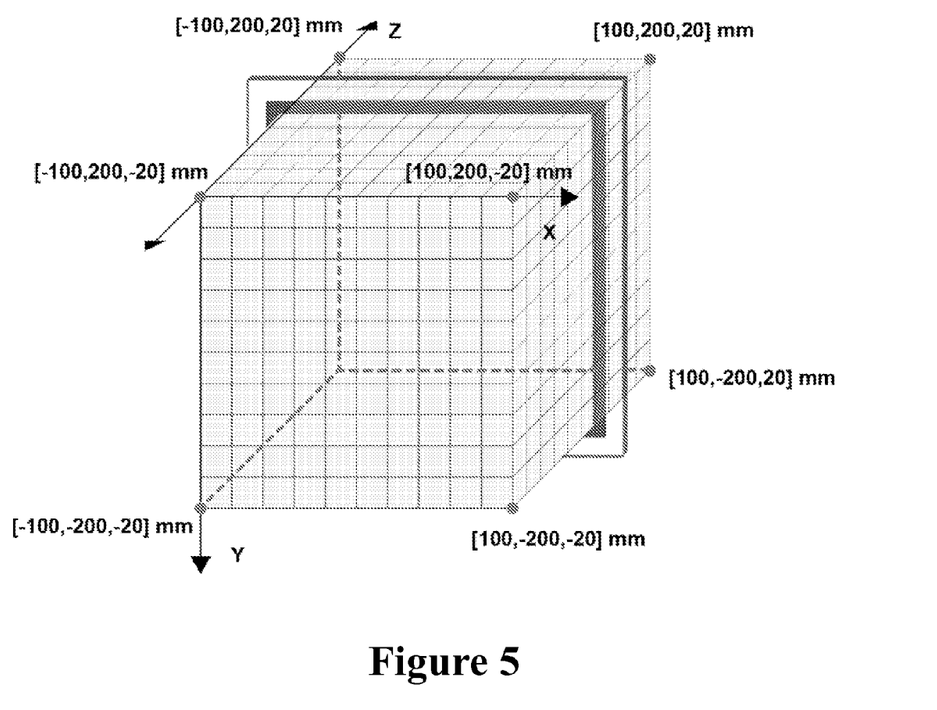
FIG. 5 shows an image 3-Dimensional spatial real world coordinate schematic diagram of a gesture control system capable of interacting with 3D images in accordance with the present invention.

| Image Real World Coordinates | | |
|---|---|---|
| Pixel (x, y) | Depth (z) | Image 3-Dimensional Spatial Real World Coordinate (mm) |
| (1, 1) | 10 | (−120.525, 80.23, −90.12) |
| (1, 2) | 10 | (−120.325, 80.02, −90.12) |
| ... | ... | ... |
| (860, 540) | −200 | (0, 0, 20) |
| ... | ... | ... |
| (1920, 1080) | 0 | (120.525, −80.23, 0) |

When the user's hand(s) and finger(s) move within the sensing area at the top of the gesture recognition device 20, the hand(s) and finger(s) image detection module 21 of the gesture recognition device 20 captures a hand(s) and finger(s) image thereof to establish node graphs and depth graphs of hand(s) and finger(s) movements, and then calculates a hand(s) and finger(s) coordinate B based on the sensor data of the hand(s) and finger(s) image detection module 21. Assuming that a relative real world coordinate of the sensing area is $(\alpha, \beta, \gamma)$, please refer to FIG. 6 and Table 2 as follows.

TABLE 2

Figure 6:
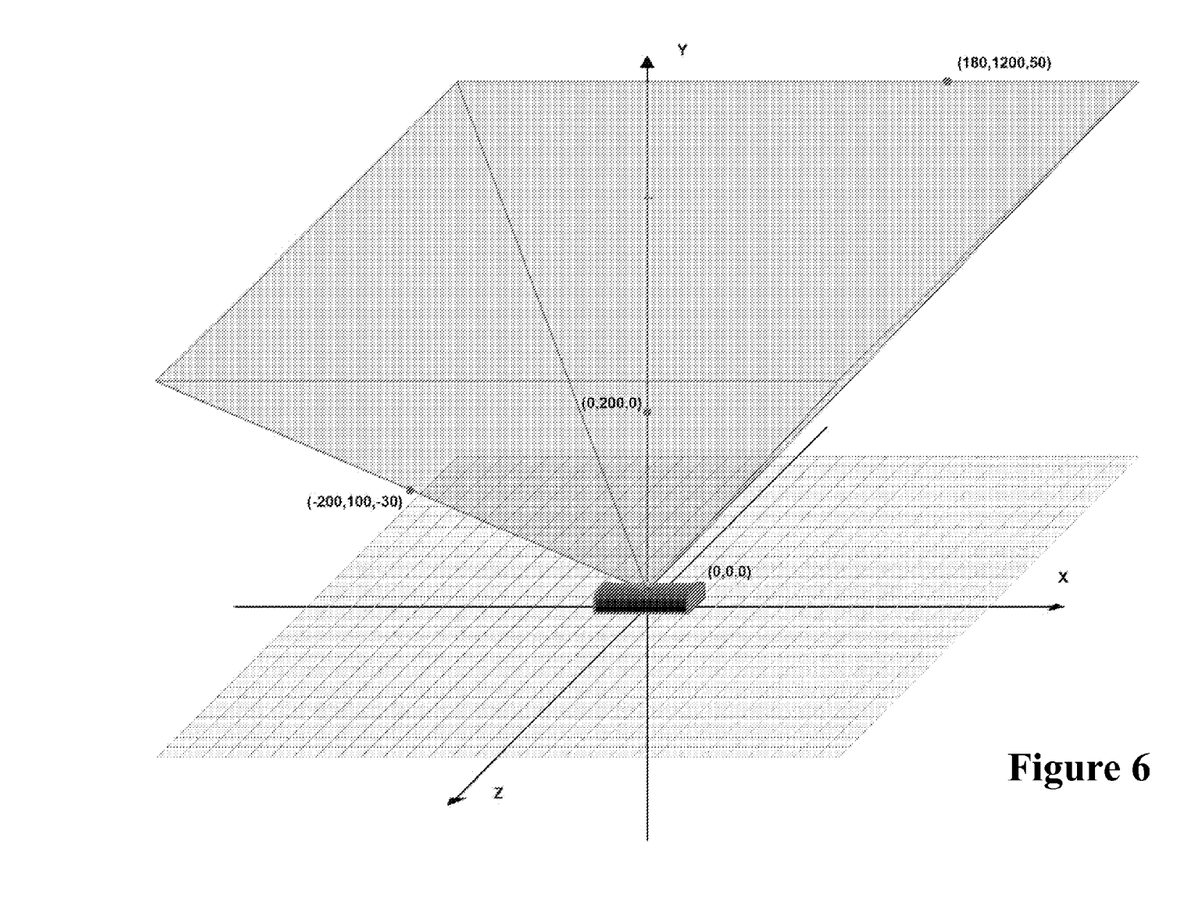
FIG. 6 shows a hand(s) and finger(s) coordinate schematic diagram of a gesture control system capable of interacting with 3D images in accordance with the present invention.

| Hand(s) and Finger(s) Real World Coordinates | |
|---|---|
| Gesture Control System Coordinates (x, y, z) | Hand(s) and Finger(s) Real World Coordinates (mm) |
| (0, 0, 0) | $(0 + \alpha, 0 + \beta, 0 + \gamma)$ |
| (1, 0, 1) | $(0.025 + \alpha, 0 + \beta, 0.025 + \gamma)$ |
| ... | ... |
| (−450, 800, 1200) | $-450*0.025 + \alpha, 800*0.025 + \beta, 1200*0.025 + \gamma$ |
| ... | ... |
| (2000, 1500, 5800) | $2000*0.025 + \alpha, 1500*0.025 + \beta, 5800*0.025 + \gamma$ |

Figure 7:
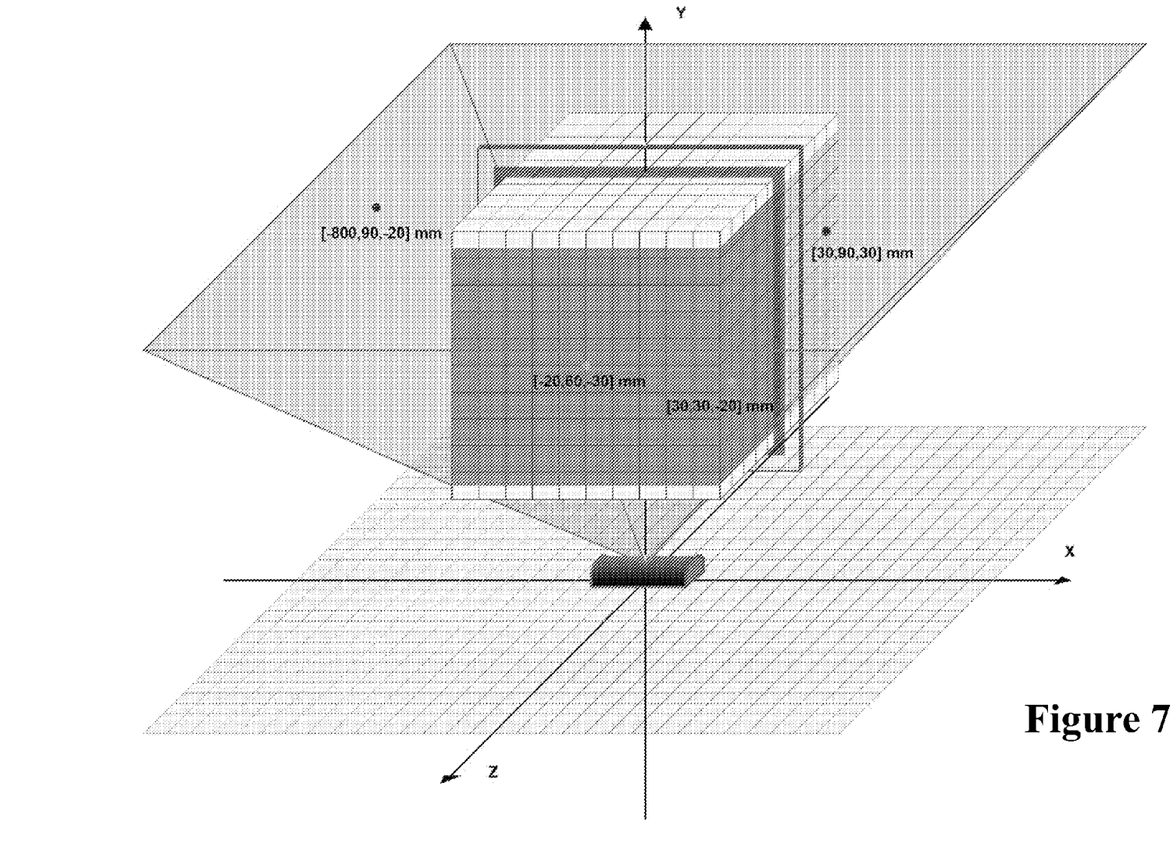
FIG. 7 shows a matching superimposition schematic diagram of an image coordinate diagram and hand(s) and finger(s) coordinate diagram of a gesture control system capable of interacting with 3D images in accordance with the present invention.

The hand(s) and finger(s) coordinate B is transmitted to the central processing unit 31 of the data processing unit 30 for calculation and software processing to match with the image's 3-dimensional spatial coordinates A that are outputted to the 3D image display device 10, referring to FIG. 7 and Table 3 as follows.

TABLE 3

| Superimposition of Image 3-dimensional Real World Spatial Coordinates and Hand(s) and finger(s) Real World Coordinates | |
|---|---|
| Matching Superimposed Real World Coordinates (mm) | Pixel (x, y) |
| (−120.525, 80.23, −90.12) | (1, 1) |
| (−120.325, 80.02, −90.12) | (1, 10) |
| ... | ... |
| (0, 0, 20) | (860, 540) |
| ... | ... |
| (120.525, −80.23, 0) | (1920, 1080) |

Figure 8:
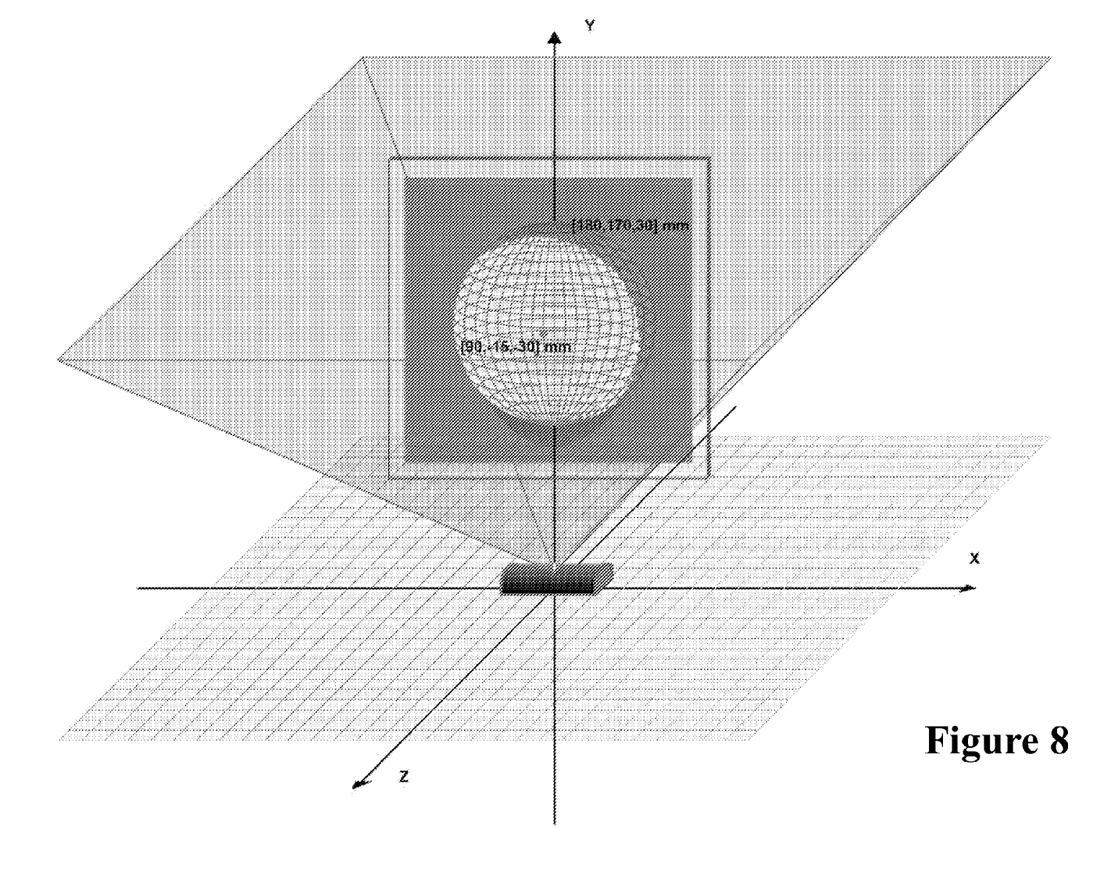
FIG. 8 shows a display schematic diagram for displaying matching superimposition result(s) of FIG. 7 of an image coordinate diagram and hand(s) and finger(s) coordinate diagram of a gesture control system capable of interacting with 3D images in accordance with the present invention.

Finally, the 3D image display device 10 outputs the superimposed result so that the virtual object of the image data and the physical hand(s) and finger(s) are seemingly connected or engaged so as to achieve unity of the virtual and real worlds. The subset of coordinates of the matching image(s) and physical hand(s) and finger(s) are connected in software such that motions of the hand(s) and finger(s) will then dictate motions and orientation changes of the display image of the 3D image display device 10. Preferably, the data storage module 33 of the data processing unit 30 comprises a plurality of built-in image files or graphic files, and the image files or graphic files are pre-programmed to be displayed in a preset order. When the hand(s) and finger(s) coordinate B is transmitted to the central processing unit 31 of the data processing unit 30 for calculation and then is matched with the image 3-dimensional spatial coordinate A established by the graphics processing unit 32 for being output via the 3D image display device 10, the image files or graphic files to be displayed as shown in FIG. 8 will be processed to generate continuously dynamic changes or color changes so as to create a real-time feeling of interacting with 3D images for the users.

In summary, the gesture control system capable of interacting with 3D images in accordance with the present invention is characterized as the following. The hand(s) and finger(s) image detection module 21 captures a hand(s) and finger(s) image of the users. The hand(s) and finger(s) coordinate tracking module 22 calculates a hand(s) and finger(s) coordinate B based on the sensor data of the hand(s) and finger(s) image detection module 21. The hand(s) and finger(s) coordinate B is transmitted to the central processing unit 31 of the data processing unit 30 for calculation and is matched with the image real world 3-dimensional spatial coordinates A established by the graphic processing unit 32 for being output via the 3D image display device 10 in order to achieve advantages of interacting with 3D images.

Described above is only used for explanation and description of a preferred embodiment of the present invention. Where those skilled in this art can make all sorts of other changes or improvements based on the above description, the changes or improvements are still covered within the inventive spirit of the present invention and the claimed scope as defined in the following claims.

What is claimed is:

1. A gesture control system capable of interacting with three-dimensional (3D) images, comprising:
a 3D image display device to display a 3D stereoscopic or auto-stereoscopic image;
a gesture recognition device, comprising a hand(s) and finger(s) image detection module and a hand(s) and finger(s) coordinate tracking module, the hand(s) and finger(s) image detection module being electrically connected to the hand(s) and finger(s) coordinate tracking module, the hand(s) and finger(s) image detection module capturing a hand(s) and finger(s) image of a user, and the hand(s) and finger(s) coordinate tracking module calculating a hand(s) and finger(s) coordinate based on image changes generated by user's hand(s) and finger(s) movements; and
a data processing unit electrically connected to the 3D image display device and the gesture recognition device, and comprising a central processing unit and a graphic processing unit, the central processing unit being electrically connected to the graphics processing unit, the central processing unit comprising a built-in software algorithm program, and one of the central process unit and the graphic processing unit comprising a built-in image coordinate software program for establishing an image 3-dimensional spatial coordinate based on an image data to be displayed on the 3D image display device, a sensing functional area being defined by positions and orientations of the gesture recognition device, wherein when user's hand(s) and finger(s) move within the sensing functional area, the gesture recognition device captures the hand(s) and finger(s) image of the user, and calculates a hand(s) and finger(s) coordinate based on sensed data of the hand(s) and finger(s) image detection module, the hand(s) and finger(s) coordinate is then transmitted to the data processing unit for calculation and is matched with the image 3-dimensional spatial coordinates by superimposition of the hand(s) and finger(s) coordinate and the image 3-dimensional spatial coordinate for being output via the 3D image display device, and by adjusting a virtual position of the 3D image via changing a depth map of the image data to be displayed according to 3D positions of finger(s) and hand(s) of the user in the real world so that a depth of the image data to be displayed by the 3D image display device in the real world matches z-coordinates of the finger(s) and hand(s) in real world;
wherein the sensing functional area is defined by positions and coordinates of the gesture recognition device, and a size of the sensing functional area varies based on at least one of sensing element types, quantity and deploying configuration.

2. The gesture control system capable of interacting with 3D images as claimed in claim 1, wherein the 3D image display device is selected from one of a liquid crystal display, plasma display panel, and organic light-emitting diode display capable of displaying stereoscopic or auto-stereoscopic images.

3. The gesture control system capable of interacting with 3D images as claimed in claim 1, wherein the gesture recognition device is selected from one of a 3D stereo camera, a single camera, an infrared sensor, and a time-of-flight sensor.

4. The gesture control system capable of interacting with 3D images as claimed in claim 1, wherein the hand(s) and finger(s) image comprises a node graph and a depth graph of the user's hand(s) and finger(s) movements.

5. The gesture control system capable of interacting with 3D images as claimed in claim 1, wherein the data processing unit is equipped with a data storage module, and the data storage module is electrically connected to the central processing unit and the graphics processing unit.

6. The gesture control system capable of interacting with 3D images as claimed in claim 5, wherein the data storage module comprises a plurality of built-in image data which are image files or graphic files, and the files are subjected to be read by the data processing unit and be output via the 3D image display device.

7. The gesture control system capable of interacting with 3D images as claimed in claim 6, wherein the image files or graphic files are pre-programmed to be displayed in a preset order.

8. The gesture control system capable of interacting with 3D images as claimed in claim 1, wherein a subset of the matching hand(s) and finger(s) coordinate and the image 3-dimensional spatial coordinate is connected in software such that the user's hand(s) and finger(s) movements dictate motions and orientation changes of the display image of the 3D image display device.

9. The gesture control system capable of interacting with 3D images as claimed in claim 1, wherein the image 3-dimensional spatial coordinate varies based on a size of the 3D image display device.

* * * * *